Nov. 17, 1936.  C. NORDSTRÖM  2,061,247
SPARK CATCHER
Filed Dec. 3, 1934
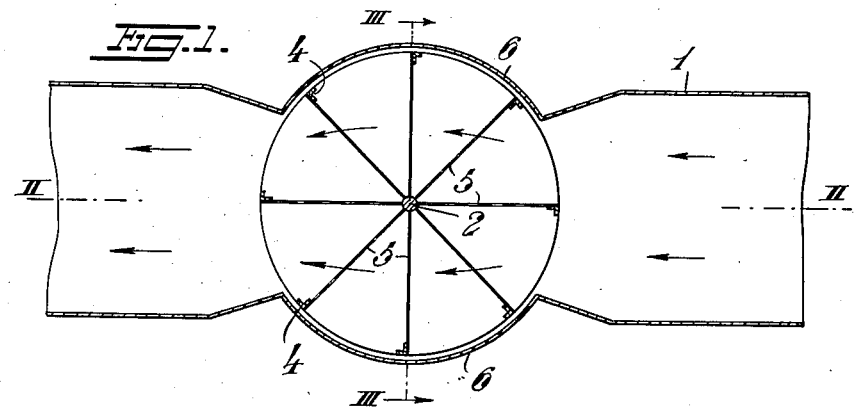
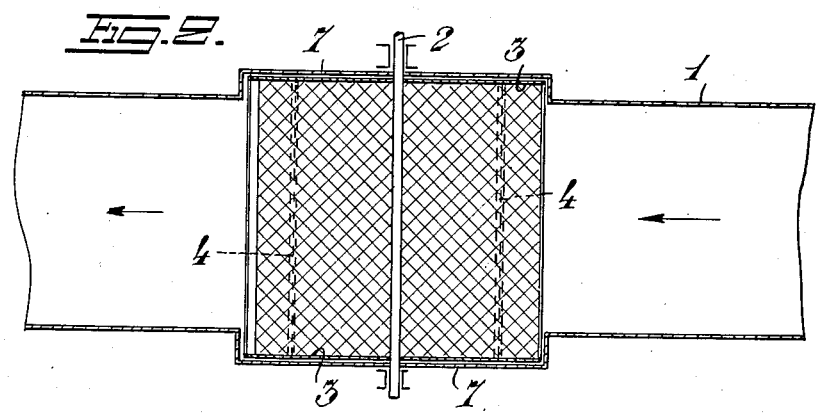
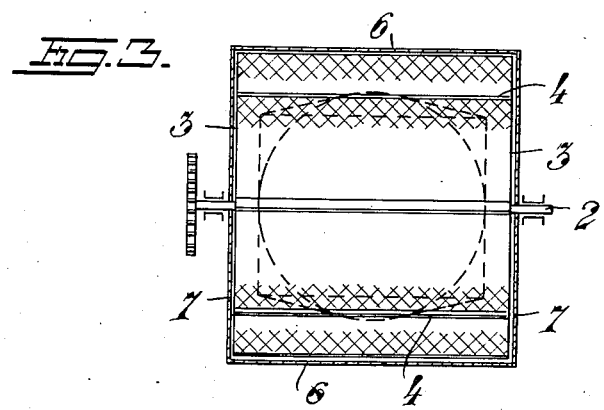
Inventor
Otto Nordström
By Sommers & Young Patented Nov. 17, 1936

2,061,247

UNITED STATES PATENT OFFICE 2,061,247

SPARK CATCHER

Otto Nordström, Sundsvall, Sweden

Application December 3, 1934, Serial No. 755,817
In Sweden March 12, 1932

2 Claims. (Cl. 110—119)

This invention refers to spark catchers and has for its object to provide a device for catching and extinguishing sparks in the main flue or chimney of furnaces fed with waste wood, saw dust or similar fuels of a character liable to produce sparks. Another object of the invention is to provide a spark catcher which is especially adapted for use in connection with the furnace installations of cellulose mills or other plants, in which the flue gases are used for drying purposes, as for drying fuel, where it is of great importance to prevent all glowing particles contained in the flue gases, from reaching the material to be dried. It is to be understood, however, that the invention may be also applied to the main flue or chimney of other furnaces, as, for instance, to the chimneys of locomotives, where extinguishing of the sparks is necessary or desirable.

With these and other objects in view the spark catcher according to the invention is constructed so as not only to cause the sparks to become extinguished by keeping them against movement for a sufficiently long period of time, but also to take care of the withdrawal of the particles from the flue or chimney after they have been extinguished.

The invention will be more readily understood from the detailed description hereinafter given, reference being had to the accompanying drawing which illustrates a preferred form of the invention.

Fig. 1 is a diagrammatic cross section of the spark catcher inserted in a conduit shown in longitudinal section. Fig. 2 is a section on the line II—II of Fig. 1. Fig. 3 is a section on the line III—III of Fig. 1.

With reference to the drawing, the numeral 1 indicates the flue of a furnace, not shown, said flue, for the sake of simplicity, being assumed to be horizontal. Mounted in said flue so as to rotate about a transverse horizontal shaft 2 therein, is a blade wheel comprising, for instance, two end walls 3 connected together at their periphery by axially extending bars 4, preferably structural iron bars, and perforated radial blades or walls 5 extending from the shaft 2 to the respective bars 4 and attached at their ends to the end walls 3. The perforated blades or walls 5 are made from wire net, the meshes of which are sufficiently small in size to positively retain any sparks or solid particles contained in the gaseous stream passing through the flue 1. The walls 5 form a plurality of pockets between themselves which are completely open at the periphery of the wheel but closed at the ends thereof. The blade wheel is exposed to the incoming and outgoing sections of the conduit at two opposite sides of the wheel but is closely surrounded by cylindrical wall portions 6 of the conduit at the two remaining sides, said walls 6 fitting so closely around the blade wheel as to prevent the solid particles from passing between them and the bars 4. Each of the walls 6 should extend along a portion of the periphery of the wheel which is, at least, equal to the peripheral distance between each two blades 5. The end walls 3 of the blade wheel are covered by stationary walls 7 forming parts of the conduit 1 in which the shaft 2 is mounted. It is thus seen that the end walls 7 together with the cylindrical walls 6 represent a covering for the blade wheel which is connected to the flue at diametrically opposite sides of the periphery of the wheel. In the drawing, the said covering 6, 7 is shown as formed integrally with the flue 1. It is to be noted, however, that the covering together with the blade wheel may also be constructed so as to form a unitary structure, the covering of which is provided with means, as flanges, for its connection with the flue.

The waste gases passing through the incoming part of the flue 1 in the direction of the arrows, may freely pass through the blades 5 of the blade wheel and enter the outgoing part of the flue to be further passed to the chimney or to a drying plant. All sparks and other solid particles passing along with the gases through the incoming part of the flue, will be caught by the blades 5 and retained in the pockets of the blade wheel, until said pockets upon the continued rotation of the wheel are exposed to the outgoing part of the flue. During this passage from the receiving side of the blade wheel to the delivery side thereof, the sparks will have sufficient time to become extinguished, the speed of the wheel being properly chosen to secure this effect. When the pockets are exposed to the outgoing part of the flue, that is to say, after the wheel has performed about half a revolution, the now extinguished solid particles will be carried away by the gases.

It is to be noted that the catcher may also take other forms than that shown in the drawing without departing from the principle of the invention.

What I claim is:—

1. A spark extinguisher, comprising a drum-shaped casing having two oppositely positioned openings at its periphery, a gas inlet connected to one of said openings and a gas outlet connected to the other opening, a driven shaft extending centrally through the drum, two circular discs attached to said shaft in close proximity to the end walls of the casing, perforated radial blades extending between said discs so as to form a blade wheel having the space between said discs divided into a plurality of pockets open at the periphery of the blade wheel in order, upon slow rotation of the wheel, to receive glowing particles as entering from the gas inlet and retain them for a sufficient time to cause them to become extinguished before delivering them to the gas outlet, while allowing continuous passage of the gases from the gas inlet to the gas outlet.

2. A spark extinguisher comprising a rotatable blade wheel open all around its periphery, perforated partitions dividing said wheel into a set of pockets open at the periphery of the wheel, a stationary gas inlet, a stationary gas outlet, and two cylindrical stationary wall portions between said inlet and said outlet, said inlet, outlet and wall portions being so arranged with respect to the rotatable wheel that upon rotation of the wheel each pocket thereof will in order be exposed to the gas inlet to receive glowing particles therefrom, then closed at the periphery of the wheel by one of said wall portions, then exposed to the gas outlet to allow the extinguished particles to be discharged to said outlet, and then again closed at the periphery of the wheel by the other wall portion, said perforated walls always allowing free passage of the gas from the inlet to the outlet irrespective of the rotation of the wheel.

OTTO NORDSTRÖM.